No. 677,826. Patented July 2, 1901.
R. VARLEY, Jr.
CONTROLLING MEANS FOR ELECTRIC CIRCUITS.
(Application filed Aug. 16, 1900.)
(No Model.)
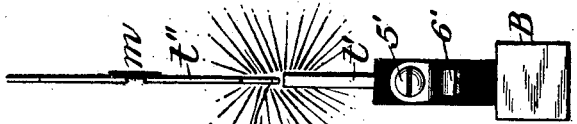
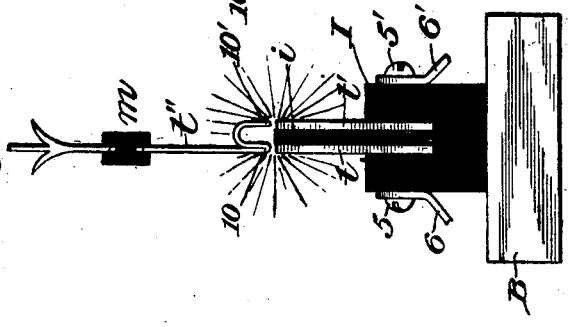
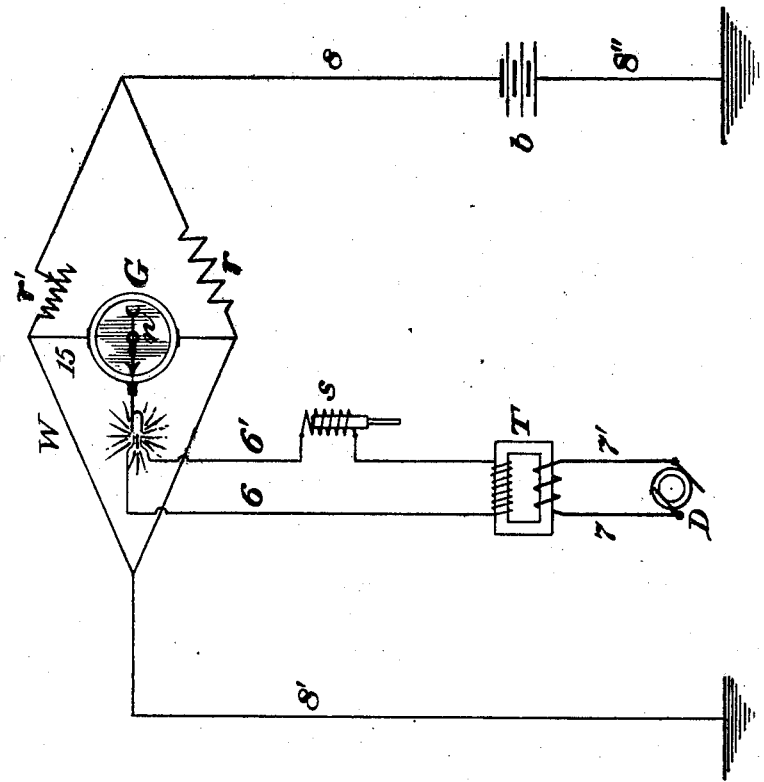
Witnesses:
Inventor:
Richard Varley, Jr.,
By his Attorney
F. H. Richards.

UNITED STATES PATENT OFFICE.

RICHARD VARLEY, JR., OF JERSEY CITY, NEW JERSEY.

CONTROLLING MEANS FOR ELECTRIC CIRCUITS.

SPECIFICATION forming part of Letters Patent No. 677,826, dated July 2, 1901.

Application filed August 16, 1900. Serial No. 27,031. (No model.)

*To all whom it may concern:*

Be it known that I, RICHARD VARLEY, Jr., a citizen of the United States, residing in Jersey City, in the county of Hudson and State of New Jersey, have invented certain new and useful Improvements in Controlling Means for Electric Circuits, of which the following is a specification.

This invention relates to controlling means for electric circuits, and especially to a controlling device suitable for use wherever it is desired to obtain an extremely sensitive action of a device or circuit to be controlled.

It is well known that controlling devices which depend for their proper operation principally upon the movements of mechanically-operating parts, especially when these are of considerable size, are unsuitable for use in electrical testing devices or apparatus, for the reason that they are not sensitive enough to respond instantaneously when brought into action. The inertia of parts of considerable size, the resistance of the air to the movements thereof, and various other features combine to prevent the immediate response of any such part to the force tending to operate the same, and it is only by making use of a device which will have but slight inertia and will oppose but little resistance to the air that a practically instantaneous movement of the part to be controlled can be obtained. One of the principal uses for such a sensitive controlling device as this is in connection with meters—such, for example, as galvanometers for determining accurately the resistance of a conductor or of a circuit. It is frequently desirable in using a galvanometer to determine an unknown resistance in an electric bridge to employ in connection with the galvanometer means for indicating instantaneously in some other manner than by the reading of the galvanometer-scale the exact moment at which a variable unknown resistance balances the known resistance of the bridge-circuit and also to stop the intercalation of resistance into the circuit at the instant that the resistances of the bridge-circuit are balanced. These results I accomplish by means of an improved controlling device which is very sensitive in its action and the movements of which are dependent upon variations either in the amperage or voltage of the current or in the resistance of the circuit in which the electric meter or galvanometer is included. I prefer to employ a controlling device of which such meter or galvanometer forms a part and in which a contact or terminal moving in synchronism with the pointer or needle of the meter is employed to control a circuit not by the mechanical sweep of the moving part into or out of engagement with a contact or circuit terminal, but by the approach toward or withdrawal from a pair of circuit-terminals separated by an air-gap of a conducting-terminal which on such movement will strain the dielectric between it and the separated circuit-terminals to the point of rupture, and thus produce a disruptive discharge between such terminals, which discharge will form a conducting-path dependent solely upon the electrostatic tension at such point and not in any way upon mere mechanical contact of the relatively movable terminals. This device will usually be embodied in and constitute the essential feature of a relay which is not, however, of the ordinary type, but is what I term a "spark-relay," and will make and break the local circuit not by actual contact of metallic terminals, but by varying the resistance of the air-gap separating the terminals of such local circuit. This local circuit will be made whenever the controlling device governing the same approaches near enough to the terminals of such local circuit to lower the resistance of the air-gap to a point where a charge from a suitable source of electric energy controlling the local circuit will jump the air-gap and complete the local circuit by forming a spark between such terminals.

In the drawings accompanying this specification and forming part of the present application, Figure 1 illustrates diagrammatically controlling means embodying my present invention and properly connected in circuit for governing a circuit or device to be controlled thereby; and Figs. 2 and 3 are enlarged details illustrating the spark-contact device or spark-relay by means of which such circuit or device to be governed is controlled, the parts being shown in side and end elevation.

My invention is embodied in any electrical system or circuit in which two terminals controlling the making or breaking of the circuit are separated by an air-gap or spark-gap which is closed by suitable means for producing a disruptive discharge between such terminals and forming a conducting-path of gas and metallic vapors or particles of sufficiently-low resistance to permit sparking between the separated terminals. These separated terminals may be of any suitable type and may be connected in any circuit adapted to permit the passage of a current of sufficiently-high tension to produce a disruptive discharge between the terminals when the resistance of the spark-gap separating them is lowered to the proper extent. Here said terminals are indicated by $t$ and $t'$, respectively, and may be strips of copper or other suitable conducting material. Preferably these terminals will be separated not only by an air-gap or spark-gap of suitable length, but also by a non-conducting material, which will usually be in sheet form, preferably a sheet or sheets of mica, as indicated at $i$. The two terminals $t$ and $t'$ and the insulation $i$ may be assembled and inserted in that form in a slot in a block of insulating material, such as I, supported on a base-board B, the terminals and the mica being held in place in any suitable manner—as, for example, by means of a pair of screws 5 and 5', passed through the block I and binding against the sides of the terminals $t$ and $t'$. These screws may constitute binding-posts for conductors, such as 6 and 6', the ends of which may be looped around the shanks of the screws in the usual manner, these conductors forming in this case part of a local circuit which will be closed by a main or controlling circuit in a manner similar to the closing of a local circuit by an ordinary relay governed by a main-line or controlling circuit. Preferably the insulating material or mica $i$ will extend slightly beyond the ends of the conducting-terminals $t$ and $t'$ in order to assure the perfect separation and insulation of such terminals.

As before stated, the contacts just described constitute the local-circuit terminals of a relay, the main-circuit contact of which will be governed by a suitable controlling device and will preferably be operated by a meter included in the controlling-circuit, said meter, and hence the main-circuit contact of the relay, being governed by changes either in the voltage or in the amperage of the current flowing through the circuit or by variations in the resistance of the conducting-path through which such current flows. In the present case, however, the meter employed is a galvanometer forming part of a device for determining the resistance of the controlling-circuit, and hence the relay embodies in its construction a galvanometer and also a local-circuit controller the movements of which are determined by such galvanometer, this local-circuit controller moving in the present case in synchronism with the galvanometer-needle and being preferably substantially of the construction shown herein at $t''$. This terminal $t''$, it will be observed, has for its center or pivot the pivot of the galvanometer-needle and is therefore very sensitively poised and very light. Hence it has but slight inertia to retard its movement when a current passes through the coils of the galvanometer, and it will respond to such flow of current and will be deflected in exactly the same manner as the needle $n$ of the galvanometer G. This terminal $t''$ may be of any suitable conducting material, such as copper, and may be of any shape desired, but will preferably be formed from a strip or contact-arm forked at its contact end and bent upon itself to form a substantially U-shaped member, the two contact-points 10 and 10' of which will be spaced at an interval approximately equal to that between the ends of the contact-terminals $t$ and $t'$. Hence when said contact $t''$ swings to the position shown in the drawings it will not engage the separated terminals of the local circuit, but will lie adjacent thereto and will be so close to said terminals that the length of the air-gap or spark-gap separating the latter will be reduced to such an extent that the current in the local circuit will jump the gap and form a spark-contact which will complete the local circuit, the heated particles of the gas or air at the gap and the metallic particles of vapor separated from the terminals by sparking serving to maintain the circuit until the arm $t''$ is withdrawn to a point where the resistance of the spark-gap will be so great that the current in the local circuit will no longer be able to rupture the same and produce a disruptive discharge between the local-circuit terminals. This arm $t''$ may be insulated from the needle $n$ by a strip of mica $m$, to which said parts may be riveted.

The local circuit in which the terminals $t$ and $t'$ are included will preferably be a high-tension one capable of producing and maintaining a spark of considerable length between said terminals, and in the present instance the conductors 6 and 6', connected to these terminals, are connected in circuit with the secondary winding of a step-up transformer T, the primary of which may be connected to the line-wires 7 and 7' of an ordinary incandescent-light circuit deriving current from a dynamo, as shown at D.

The local-circuit controller of the relay, and hence the meter by which it is governed, may be controlled in any proper manner, but preferably will be operated by an electrical testing instrument connected in the controlling-circuit and responsive to every variation in the flow or strength of the current or in the resistance of the circuit, according to the character of the instrument. In this case, however, the testing instrument is a galvanometer placed in the bridge-wire 15 of an electric balance, such as the Wheatstone bridge, this bridge being connected to the conductors 8 and 8' of the controlling-circuit, which also includes a source of energy or battery b and a conductor 8'', both of the conductors 8' and 8'' being grounded in the present instance. One of the arms of the bridge, which bridge is designated by W, has the usual known resistance r therein, while the opposite arm of the bridge contains the unknown or variable resistance r'. This unknown resistance will usually be gradually intercalated into the circuit either by hand or automatically, as may be required, and the contact t'' may be set to complete the local circuit when the needle n reaches any predetermined point on the galvanometer-scale, it being set usually so as to make the local circuit when the galvanometer-needle reaches the zero-point and the resistances in the bridge-circuit are balanced.

It will be obvious that the making of the local circuit will take place instantaneously on the arrival of the contact t'' at the desired point and that a suitable translating device, such as a solenoid s, may be operated also instantaneously to effect a corresponding movement of any other part (not shown) which it may be desired to actuate with great certainty and rapidity.

As all of the devices herein described either operate or are operated electrically, and as there is no part which is dependent to any material extent upon the movement or sweep of a mechanically-operating element for its proper movement, it will be evident that my improved controlling means is especially adapted for use wherever it is desired to actuate any member practically instantaneously when the moment for operating the same has arrived and that fact has been indicated by the device or circuit which controls the same.

Having thus described my invention, I claim—

1. The combination, with an electric circuit having a pair of terminals separated by a spark-gap, of a controlling device associated with and supported for movement relative to said terminals for varying the resistance of said spark-gap and producing a disruptive discharge between said terminals.

2. The combination, with an electric circuit having a pair of terminals separated by a spark-gap, of an automatic controlling device associated with and supported for movement relative to said terminals for varying the resistance of said spark-gap and producing a disruptive discharge between said terminals.

3. The combination, with a local circuit having a pair of terminals separated by a spark-gap, of a controlling-circuit, and a controlling device governed by said controlling-circuit and supported for movement relative to said terminals for varying the resistance of said spark-gap and producing a disruptive discharge between said terminals of the local circuit.

4. The combination, with a local circuit having a pair of terminals separated by a spark-gap, of a controlling-circuit, and a controlling device included in said controlling-circuit and supported for movement relative to said terminals for varying the resistance of said spark-gap and producing a disruptive discharge between said terminals of the local circuit.

5. The combination, with a local circuit having a pair of terminals separated by a spark-gap, of a controlling-circuit; an electric bridge in said controlling-circuit; and a galvanometer in the bridge-circuit and controlling the passage of a disruptive discharge between said terminals of the local circuit.

6. The combination, with a local circuit having a pair of terminals separated by a spark-gap, of a controlling-circuit; an electric bridge in said controlling-circuit; a galvanometer in the bridge-circuit; and a spark-forming device controlled by said galvanometer and in position for producing a disruptive discharge between said terminals of the local circuit on the balancing of the resistances of the bridge-circuit.

7. The combination, with a local circuit having a pair of terminals separated by a spark-gap, of a controlling-circuit; a line-circuit; a transformer the primary winding of which is included in said line-circuit and the secondary of which is included in said local circuit; and a controlling device governed by said controlling-circuit and supported for movement relative to said terminals for varying the resistance of said spark-gap and producing a disruptive discharge between said terminals of the local circuit.

8. The combination, with a high-tension local circuit having a pair of terminals separated by a spark-gap, of a translating device in said local circuit; a controlling-circuit; and a controlling device governed by said controlling-circuit and supported for movement relative to said terminals for varying the resistance of said spark-gap and producing a disruptive discharge between said terminals of the local circuit.

9. A spark-relay having a pair of local-circuit terminals separated by a spark-gap and also having a local-circuit controller associated with and movable relatively to said terminals for varying the resistance of said spark-gap and producing a disruptive discharge between said local-circuit terminals.

10. A spark-relay having a pair of local-circuit terminals separated by insulating material and also by a spark-gap, said relay also having a local-circuit controller associated with and movable relatively to said terminals for varying the resistance of said spark-gap and producing a disruptive discharge between said local-circuit terminals.

11. A spark-relay having a pair of local-circuit terminals separated by a sheet of insulating material and also by a spark-gap, said relay also having a local-circuit controller associated with and movable relatively to said terminals for varying the resistance of said spark-gap and producing a disruptive discharge between said local-circuit terminals.

12. A spark-relay having a pair of local-circuit terminals separated by a sheet of mica and also by a spark-gap, said relay also having a local-circuit controller associated with and movable relatively to said terminals for varying the resistance of said spark-gap and producing a disruptive discharge between said local-circuit terminals.

13. A spark-relay having a pair of local-circuit terminals separated by a spark-gap and also having a movable forked local-circuit controller for producing a disruptive discharge between said local-circuit terminals.

14. A spark-relay having a pair of local-circuit terminals separated by a spark-gap and also having a movable substantially U-shaped local-circuit controller for producing a disruptive discharge between said local-circuit terminals.

15. A spark-relay having a pair of local-circuit terminals separated by a spark-gap and also having a movable contact-arm the end of which is bent upon itself to form an integral U-shaped local-circuit controller for producing a disruptive discharge between said local-circuit terminals.

16. A spark-relay having a pair of local-circuit terminals separated by a spark-gap and also embodying a galvanometer having a local-circuit controller movable in unison with the galvanometer-needle and operative for producing a disruptive discharge between said local-circuit terminals.

RICHARD VARLEY, Jr.

Witnesses:
FRED. J. DOLE,
C. S. CHAMPION.